United States Patent
Nakano et al.

(10) Patent No.: US 7,237,379 B2
(45) Date of Patent: Jul. 3, 2007

(54) REGENERATION OF DIESEL PARTICULATE FILTER

(75) Inventors: Masahiko Nakano, Machida (JP);
Junichi Kawashima, Yokosuka (JP);
Naoya Tsutsumoto, Yokohama (JP);
Makoto Ootake, Yokohama (JP);
Terunori Kondo, Yokohama (JP);
Shouichirou Ueno, Yokohama (JP);
Toshimasa Koga, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 132 days.

(21) Appl. No.: 11/077,220

(22) Filed: Mar. 11, 2005

(65) Prior Publication Data
US 2005/0204731 A1    Sep. 22, 2005

(30) Foreign Application Priority Data
Mar. 17, 2004   (JP)   ............................. 2004-076268

(51) Int. Cl.
*F01N 3/00*   (2006.01)
(52) U.S. Cl. ..................... 60/295; 60/280; 60/285; 60/297; 60/311
(58) Field of Classification Search .................. 60/274, 60/278, 280, 285, 286, 295, 297, 311
See application file for complete search history.

(56) References Cited

U.S. PATENT DOCUMENTS

| | | | | |
|---|---|---|---|---|
| 5,287,698 A | * | 2/1994 | Shinzawa et al. | 60/286 |
| 5,319,930 A | * | 6/1994 | Shinzawa et al. | 60/286 |
| 6,247,311 B1 | | 6/2001 | Itoyama et al. | |
| 6,574,956 B1 | * | 6/2003 | Moraal et al. | 60/295 |
| 6,829,890 B2 | * | 12/2004 | Gui et al. | 60/295 |
| 6,851,258 B2 | * | 2/2005 | Kawashima et al. | 60/311 |
| 6,901,751 B2 | * | 6/2005 | Bunting et al. | 60/297 |
| 6,931,842 B2 | * | 8/2005 | Ohtake et al. | 60/295 |
| 6,952,919 B2 | * | 10/2005 | Otake et al. | 60/297 |
| 7,104,050 B2 | * | 9/2006 | Sato et al. | 60/295 |

FOREIGN PATENT DOCUMENTS

JP   2002-155726 A   5/2002

* cited by examiner

*Primary Examiner*—Binh Q. Tran
(74) *Attorney, Agent, or Firm*—Foley & Lardner LLP (57) ABSTRACT

A particulate filter (41) which traps particulate matter in the exhaust gas of a diesel engine (1), regenerates when a controller (31) performs an exhaust gas increase operation which includes decreasing the opening of an intake throttle (42). The controller (31), during regeneration of the filter (41), determines whether or not the required load of the diesel engine (1) is increasing from an accelerator pedal depression sensor (32) or a fuel injection amount (S3), and prevents output decrease of the diesel engine (1) by interrupting the exhaust gas temperature increase operation when the required load is increasing (S5).

12 Claims, 5 Drawing Sheets

REGENERATION OF DIESEL PARTICULATE FILTER

FIELD OF THE INVENTION

This invention relates to the regeneration of a diesel particulate filter which traps particulate matter in the exhaust gas of a diesel engine.

BACKGROUND OF THE INVENTION

Regarding the diesel particulate filter (hereafter, DPF) which traps particulate matter contained in the exhaust gas of a vehicle diesel engine, JP2002-155726A published by the Japan Patent Office in 2002 discloses a regeneration method which eliminates the particulate matter which has built up on the DPF by combustion control of the air-fuel mixture supplied to the engine.

Specifically, when the engine is required to produce an acceleration, the air-fuel ratio of the air-fuel mixture supplied to the engine is enriched by throttling the intake throttle, and the temperature of the DPF is increased to burn the particulate matter deposited on the DPF by increasing the combustion temperature of the air-fuel mixture.

SUMMARY OF THE INVENTION

In this prior art, however, as the intake throttle is throttled when there is an engine acceleration requirement, there is a possibility that the intake air amount may be insufficient, and that sufficient engine output to obtain the required acceleration will not be obtained.

It is therefore an object of this invention to prevent loss of engine kinetic performance during DPF regeneration.

In order to achieve the above object, this invention provides a regeneration device for a diesel particulate filter which traps particulate matter contained in an exhaust gas of a diesel engine. The filter is regenerated to a state where the particulate matter can be trapped again by burning trapped particulate matter due to an increase in an exhaust gas temperature.

The regeneration device comprises an engine exhaust gas temperature regulating mechanism which can increase the exhaust gas temperature to promote a regeneration of the filter, and a programmable controller programmed to determine whether or not there is an increase in a required load of the diesel engine during the regeneration of the filter, and interrupt the mechanism to increase the exhaust gas temperature, when the required load of the diesel engine is determined to be increasing during the regeneration of the filter.

This invention also provides a regeneration method for the diesel particulate filter. The method comprises determining whether or not there is an increase in a required load of the diesel engine during the regeneration of the filter, and interrupting the mechanism to increase the exhaust gas temperature, when the required load of the diesel engine is determined to be increasing during the regeneration of the filter.

The details as well as other features and advantages of this invention are set forth in the remainder of the specification and are shown in the accompanying drawings.

DESCRIPTION OF THE PREFERRED EMBODIMENTS

Figure 1:
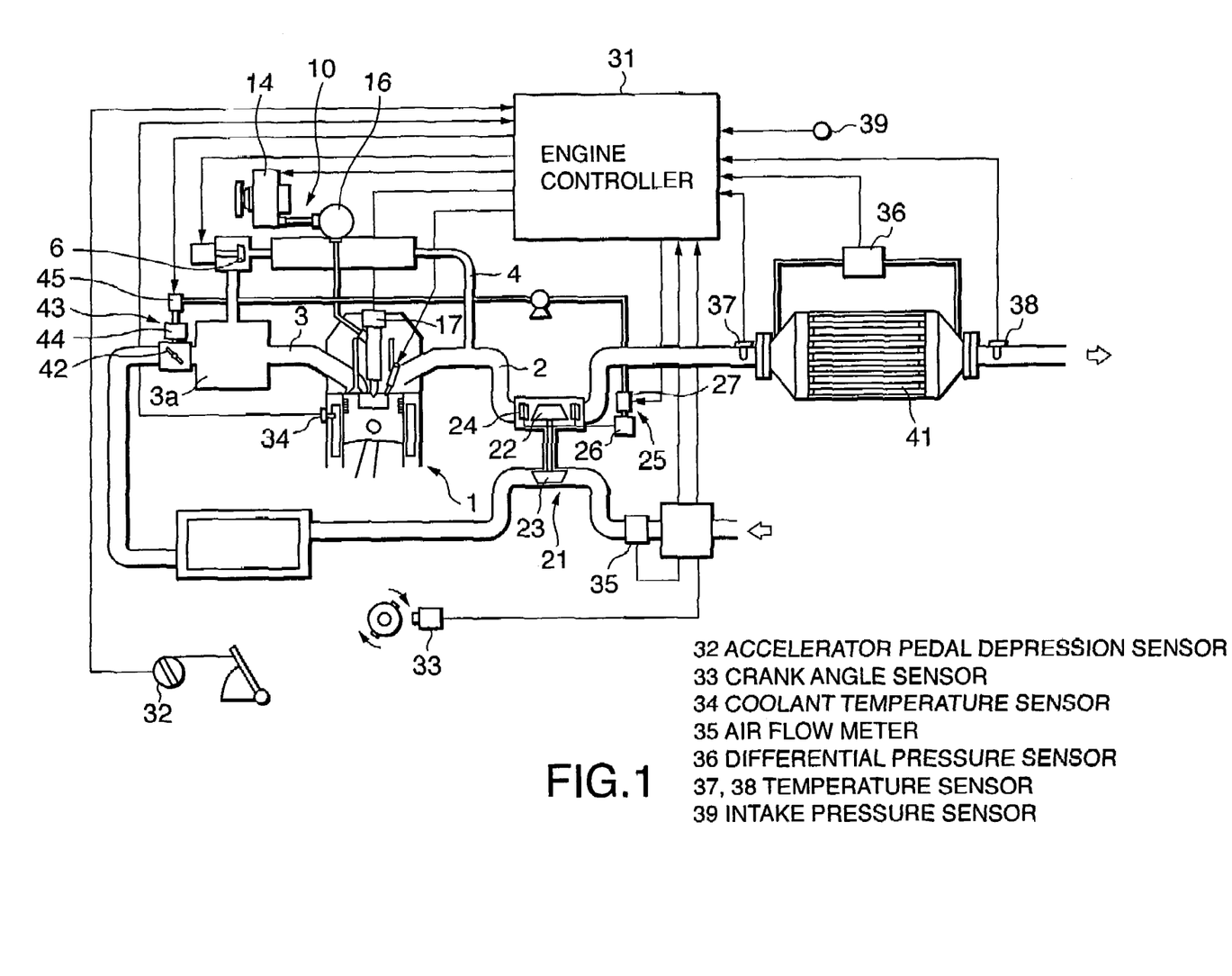
FIG. 1 is a schematic diagram of a diesel engine comprising a DPF regeneration system according to this invention.

Referring to FIG. 1 of the drawings, a multi-cylinder diesel engine 1 for vehicles is provided with an exhaust passage 2 and intake passage 3. The intake passage 3 is provided with a collector part 3a to distribute intake air to each cylinder. The exhaust passage 2 and the collector part 3a are connected by an exhaust gas recirculation (EGR) passage 4.

A diaphragm type EGR valve 6 is installed in the EGR passage 4. The EGR valve 6 is operated by a pressure limiting valve and diaphragm-type actuator according to a duty signal from an engine controller 31.

The engine 1 is provided with a common rail fuel injection device 10. The fuel injection device 10 is provided with a supply pump 14, common rail (accumulator) 16 and nozzle 17 provided for every cylinder. Fuel pressurized by the supply pump 14 is distributed to each nozzle 17 via the common rail 16.

The nozzle 17 is provided with a needle valve, nozzle chamber, fuel supply passage leading to the nozzle chamber, a retainer, a hydraulic piston and a return spring.

A three-way valve is a valve which selectively connects the common rail 16 and a drain to the fuel supply passage, and in the OFF state, maintains the needle valve in the seated position by the high-pressure fuel pressure of the common rail 16 via the fuel supply passage and the nozzle chamber. In the ON state, by releasing this pressure to the drain, the needle valve is lifted and the fuel in the nozzle chamber is injected into the cylinder. The engine 1 burns the injected fuel in the cylinder by compression ignition.

The fuel injection timing of the nozzle 17 is determined by the change-over timing from OFF to ON of the three-way valve, and the fuel injection amount is determined by the duration of the ON state of the three-way valve. If the pressure of the common rail 16 is identical, the fuel injection amount will increase as the duration of the ON state increases. ON and OFF of the three-way valve are changed over by a signal from the engine controller 31.

This type of common rail fuel injection device 10 is known from U.S. Pat. No. 6,247,311.

A turbine 22 of a variable capacity turbocharger 21 is provided in the exhaust passage 2 downstream of the EGR passage 4. The variable capacity turbocharger 21 is further provided with a compressor 23 installed in the intake passage 3. The turbine 22 transforms the energy of the flow of exhaust gas into rotational energy, and drives the compressor 23 on the same axis using this rotational energy.

A variable nozzle 24 driven by an actuator 25 is installed at the scroll inlet of the turbine 22.

The actuator 25 comprises a diaphragm actuator 26 and a pressure limiting valve 27 which adjusts the control pressure to the diaphragm actuator 26, and it varies the nozzle opening so that a predetermined turbocharging pressure can be obtained in the low rotation speed region of the engine 1. Specifically, at a low rotation speed, the nozzle opening is narrowed so that the flow velocity of exhaust gas introduced into the turbine 22 is increased, and at a high rotation speed, the nozzle opening is widened so that the exhaust gas is introduced into the turbine 22 without resistance.

The pressure limiting valve 27 adjusts the pressure of the diaphragm actuator 26 according to a duty signal from the engine controller 31 so that the opening of the variable nozzle 24 is adjusted to a target nozzle opening.

An intake throttle 42 driven by an actuator 43 is formed in the inlet of the collector part 3a.

The actuator 43 comprises a diaphragm actuator 44 which drives the intake throttle 42 according to the control pressure, and a pressure limiting valve 45 which adjusts the control pressure to the diaphragm actuator 44, according to a duty signal from the engine controller 31 so that the intake throttle 42 has a target opening.

A diesel particulate filter (DPF) 41 which traps particulate matter in the exhaust gas, is installed in the exhaust passage 2 downstream of the turbine 22.

The engine controller 31 comprises a microcomputer provided with a central processing unit (CPU), read-only memory (ROM), random-access memory (RAM) and input/output interface (I/O interface).

The engine controller 31 controls the opening of the EGR valve 6, the fuel injection timing and fuel injection amount of the nozzle 17, the opening of the variable nozzle 24 of the turbocharger 21, and the opening of the intake throttle 42. The particulate matter deposited on the DPF 41 is burned occasionally via at least control of opening of the intake throttle 42, and the DPF41 is regenerated to the state in which it can again trap particulate matter.

To perform the above control, detection signals from various sensors are inputted into the engine controller 31. These sensors include an accelerator pedal depression sensor 32 which detects a depression amount of an accelerator pedal with which the vehicle is provided, a crank angle sensor 33 which detects a rotation speed Ne and crank angle of the engine 1, a coolant temperature sensor 34 which detects a cooling water temperature of the engine 1, an air flow meter 35 which detects an intake air amount Qa of the intake passage 2, a differential pressure sensor 36 which detects a differential pressure ΔP upstream and downstream of the DPF41, a temperature sensor 37 which detects an exhaust gas temperature T1 at the inlet of the DPF41, a temperature sensor 38 which detects an exhaust gas temperature T2 at the outlet of the filter 41, and an intake pressure sensor 39 which detects an intake pressure in the collector part 3a.

When the particulate matter deposition amount of the DPF41 reaches a predetermined amount, the engine controller 31 starts regenerating the DPF 41, burns the particulate matter deposited on the DPF 41, and thereby removes it from the DPF 41.

During regeneration of the DPF 41, the engine controller 31 determines whether or not the required load of the diesel engine 1 is increasing, stops regeneration of the DPF 41 according to this determination result, and prevents decrease of the output torque of the diesel engine 1 in the transient state.

Next, referring to FIG. 4, a DPF regeneration routine performed by the engine controller 31 to realize this control will be described. This DPF regeneration routine is performed at intervals of 20 milliseconds during running of the diesel engine 1.

In a step S1, the engine controller 31 determines whether or not regeneration of the DPF 41 is being performed.

When regeneration of the DPF 41 is not being performed, the engine controller 31, in a step S2, performs the engine control known in the art for normal running. Specifically, a basic injection amount is calculated using the accelerator pedal depression amount and engine rotation speed as parameters, and the fuel injection amount of the nozzle 17 is determined based on the basic injection amount.

On the other hand, during regeneration of the DPF 41, the engine controller 31, in a step S3, determines whether or not the required load of the diesel engine 1 has increased beyond a predetermined level from the variation amount of the accelerator pedal depression amount or fuel injection amount. The variation amount is taken as the differential value of the accelerator pedal depression amount or fuel injection amount. With respect to the accelerator pedal depression amount, the predetermined level is herein set to 10 percent providing that the fully depressed state is 100 percent. The controller 31 calculates the difference in the accelerator pedal depression amount from the value on the immediately preceding occasion the routine was executed, and determines that the required load has increased beyond the predetermined level, if the difference is larger than 10 percent. With respect to the fuel injection amount, the predetermined level is for example set to 10 cubic millimeters. The state where the required load of the diesel engine 1 is increasing includes the case where a vehicle acceleration is required.

Figure 4:
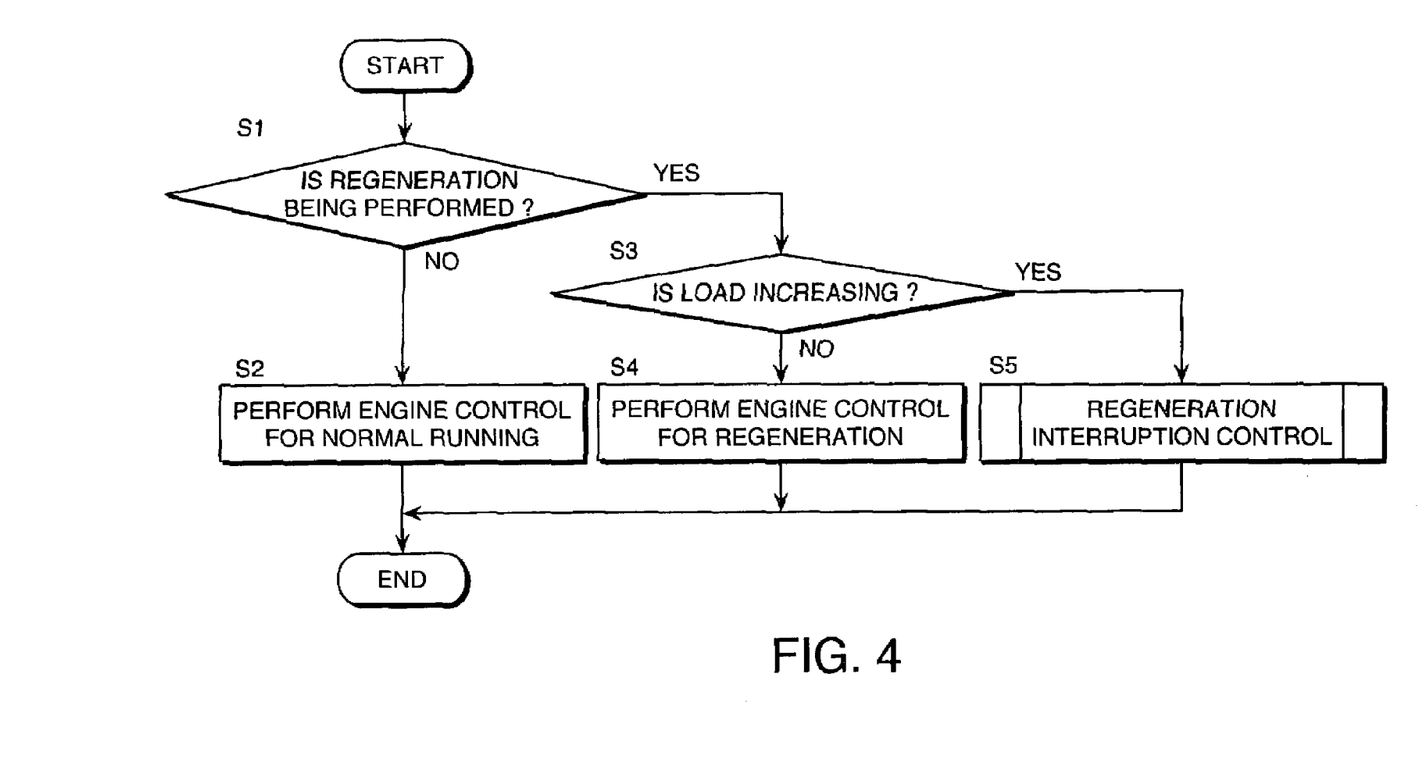
FIG. 4 is a flowchart describing a DPF regeneration control routine performed by a controller according to this invention.
Figure 5:
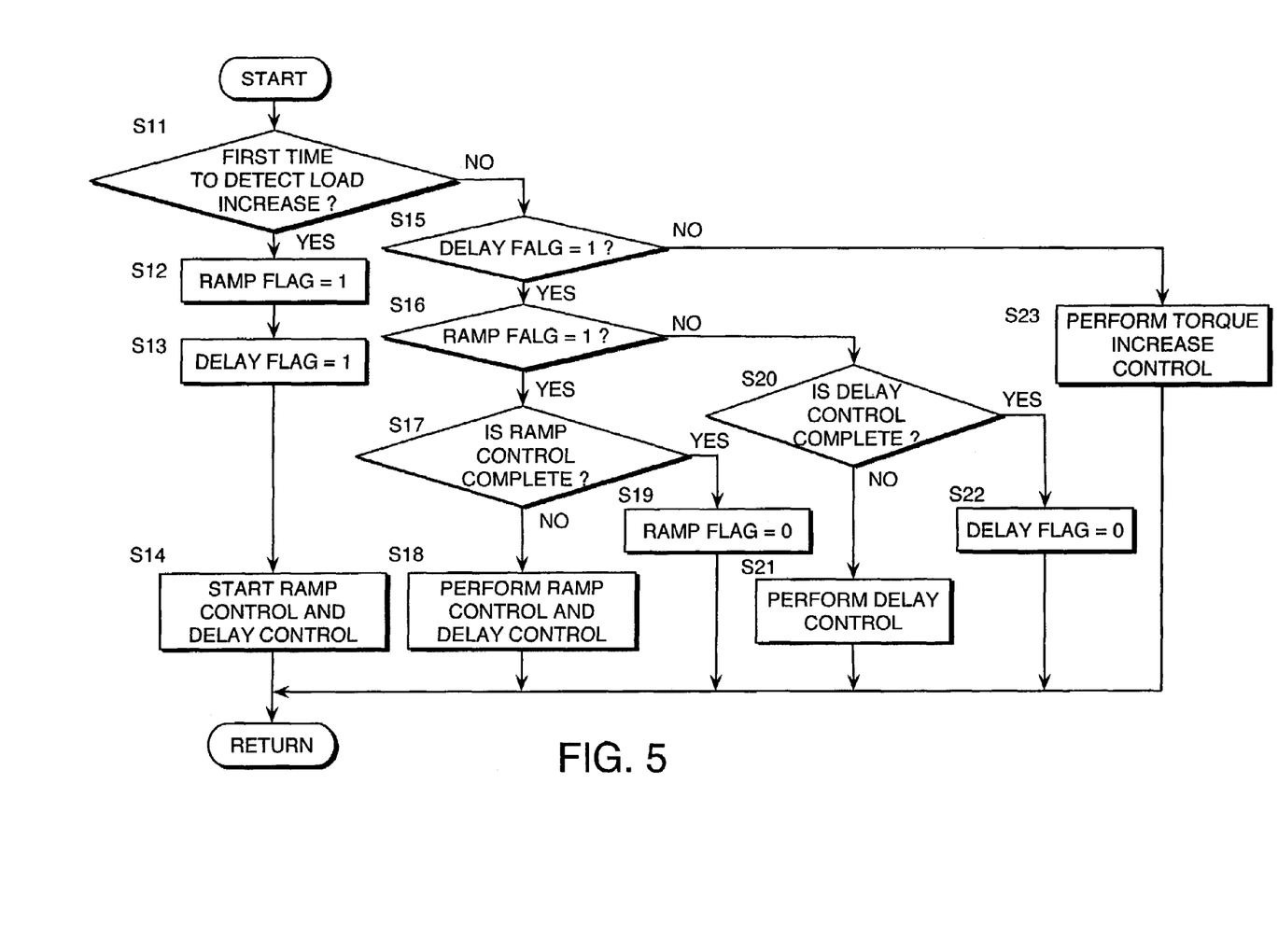
FIG. 5 is a flowchart describing a DPF regeneration interruption control routine performed by the controller.

When the required load is increasing, the engine controller 31, in a step S5, performs interruption control of DPF regeneration by performing a subroutine shown in FIG. 5. When the required load is not increasing, the engine controller 31, in a step S4, performs regeneration control of the DPF 41.

The regeneration of the DPF 41 is performed by burning particulate matter, the temperature at which particulate matter is actively burnt being 650 degrees Centigrade or more, and the temperature at which particulate matter starts to burn being 350 degrees Centigrade. Therefore, in order to start regeneration, the temperature of the exhaust gas must be increased to 350 degrees Centigrade or more. For this purpose, the engine controller 31 performs the following control.

Specifically, the engine controller 31 determines an injection timing using an exhaust gas temperature map having the basic injection amount of the nozzle 17 and engine rotation speed as parameters. The fuel injection timing of the nozzle 17 during regeneration control is retarded compared to normal running for the same basic injection amount and engine rotation speed. Also, during regeneration control, the engine controller 31 increases the fuel injection amount of the nozzle 17. Further, in the period until the running conditions of the diesel engine 1 reach the medium load, medium speed region, a second, additional injection is performed to enrich the air-fuel ratio. In the following description, the initial injection will be referred to as a main injection, and the second injection will be referred to as a post-injection.

In the low load region of the diesel engine 1, the exhaust gas temperature cannot be sufficiently increased, so the air-fuel ratio is enriched by throttling the intake throttle 42 to increase the exhaust gas temperature. The intake amount of the diesel engine 1 is controlled by the intake throttle 42, and the intake pressure is controlled by the variable nozzle 24 of the turbocharger 21.

Figure 3:
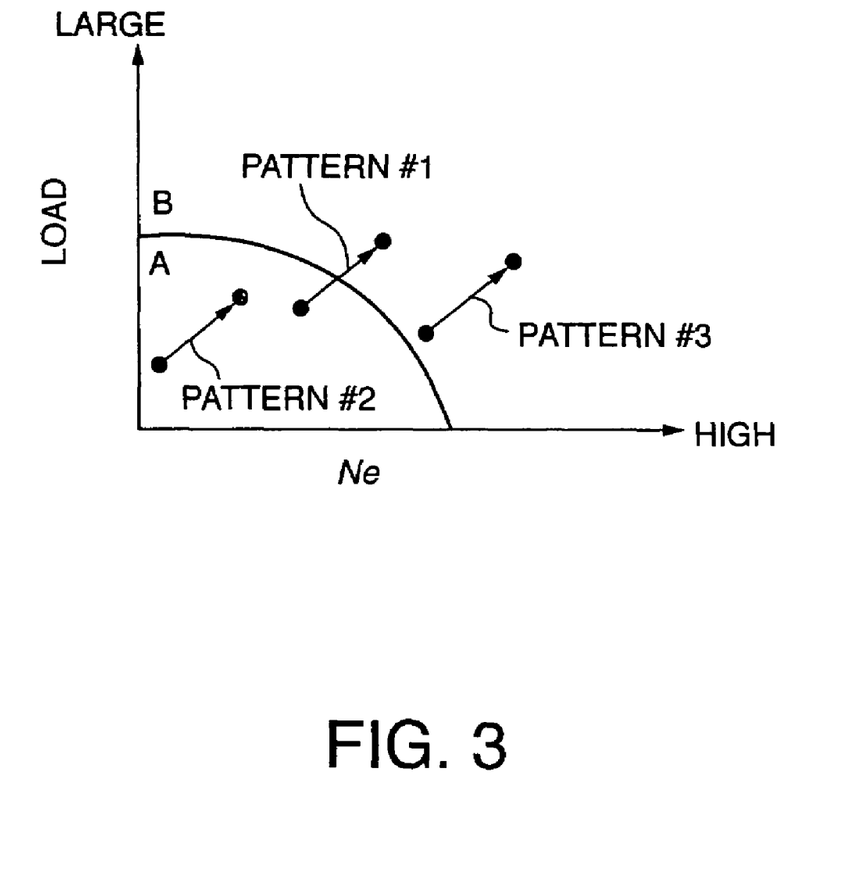
FIG. 3 is a timing chart describing an intake air amount feedback control region and intake air pressure feedback control region in a DPF regeneration according to this invention.

Referring to FIG. 3, the intake air control during regeneration of the DPF 41 will now be described. Control of the intake air amount to a target intake air amount is performed by the controller feedback-controlling the opening of the intake throttle 42 based on an intake air flow rate Qa detected by the air flow meter 35. Control of the intake pressure to a target intake pressure is performed by the controller feedback-controlling the opening of the variable nozzle 24 of the turbocharger 21 based on the intake pressure detected by the intake pressure sensor 39.

During regeneration of the DPF 41, among the two regions divided by the curve in the figure, in a low load, low rotation speed region A, the controller 31 maintains the variable nozzle 24 in the open position, and feedback controls the intake air amount due to the intake throttle 42. In the high load, high rotation speed region B, the controller 31 maintains the intake throttle 42 in the fully open position, and performs feedback control of the intake pressure due to the variable nozzle 24.

There are three acceleration patterns of the diesel engine 1, i.e., a pattern #1 wherein acceleration is performed by a continuous shift from the region A to the region B, a pattern #2 wherein acceleration is performed within the region A, and a pattern #3 wherein acceleration is performed within the region B.

When regeneration of the DPF 41 is performed in the region A, the engine controller 31 applies a smaller value for the opening of the intake throttle 42 than the value for normal running that is based on the target air intake amount.

After the processing of the steps S2, S4 and S5, the engine controller 31 terminates the routine.

Next, referring to FIG. 5, the interruption control subroutine of the DPF regeneration will be described.

In a step S11, the engine controller 31 determines whether or not increase of the required load of the diesel engine 1 was detected for the first time during the current execution of the routine of FIG. 4. Specifically, the determination result of the step S3 performed on the immediately preceding occasion the routine of FIG. 4 was executed, is compared with the determination result of the step S3 during the current execution of the routine of FIG. 4, and if the determination results are different, it is determined that the increase of required load was detected for the first time during execution of the routine of FIG. 4.

If the determination result is affirmative, the engine controller 31 performs the processing of steps S12–S14.

In the step S12, the engine controller 31 sets a ramp flag to unity.

In the next step S13, the engine controller 31 a delay flag to unity.

In the next step S14, the engine controller 31 starts ramp control and delay control.

Ramp control is control whereby the main injection timing is returned at a predetermined speed from the delay timing to the timing for normal running.

The predetermined response speed is set to be faster than the speed when the main injection timing for normal running is shifted to the retarded timing for regeneration of the DPF 41 when regeneration starts, and faster than the speed when it is returned from the retarded timing to the timing for normal running after completing regeneration of the DPF 41.

Delay control is control whereby the opening of the intake throttle 42 is returned from an opening set for regeneration of the DPF 41 to the fully open position for intake air pressure feedback control. There is a time delay from when the opening of the intake throttle 42 is increased to when the intake air amount of the diesel engine 1 actually increases. If feedback control of the intake air pressure is started during this delay period, it will cause a so-called overboost wherein the variable nozzle 24 is narrowed too much and the intake air pressure exceeds the target intake air pressure. To prevent this overboost, delay control is set to start feedback control of the intake air pressure at a predetermined time after the intake throttle 42 is fully opened.

If the step S5 was performed for the first time during execution of the DPF regeneration routine, the steps S12–S14 are always performed in the interruption control subroutine of DPF regeneration. After the step S14, the engine controller 31 terminates the subroutine.

In the second and subsequent executions of the subroutine, the determination of the step S11 is negative.

In this case, the engine controller 31, in a step S15, determines whether or not the delay flag is unity. When the delay flag is unity, the engine controller 31, in a step S16, determines whether or not the ramp flag is unity.

When the ramp flag is unity, the engine controller 31, in a step S17, determines whether or not ramp control is complete. Specifically, it is determined whether or not the main injection timing has returned to the timing for the normal running region. The determination as to whether or not ramp control is complete may be performed by determining if a predetermined ramp control period has elapsed from when the determination of the step 11 changed to be negative from affirmative. In this case the predetermined ramp control period is set to for example one second.

When the determination of the step S17 is affirmative, the engine controller 31, in a step S19, resets the ramp flag to zero, and terminates the subroutine.

When the determination of the step S17 is negative, the controller 31, in a step S18, performs the ramp control and delay control, and terminates the subroutine.

When the ramp flag in the step S16 is not unity, the engine controller 31, in a step S20, determines whether or not delay control has been completed.

Specifically, it is determined whether or not a predetermined delay time has elapsed from when the intake throttle 42 was fully opened. The predetermined delay time is preferably set to a value within a range of 2–3 seconds.

When the determination of the step S20 is affirmative, the engine controller 31, in a step S22, resets the delay flag to zero, and terminates the subroutine.

When the determination of the step S20 is negative, the engine controller 31, in a step S21, performs delay control and terminates the subroutine.

When the delay flag in the step S15 is not unity, the engine controller 31, in a step S23, shifts to control for increase of required load. This control is control for normal running whereby the intake throttle 42 is fully opened, and the main injection is performed at an injection timing for normal running.

After the processing of the step S23, the engine controller 31 terminates the subroutine.

Next, referring to FIGS. 2A–2H, the variation in the running states of the diesel engine 1 during the aforesaid DPF regeneration control routine and DPF regeneration interruption control subroutine, will be described.

Figure 2A:
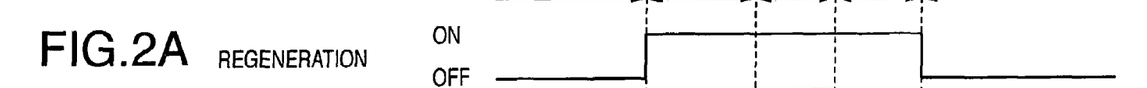
FIGS. 2A–2H are timing charts describing a variation of an engine running state under a DPF regeneration control according to this invention.

Prior to a time t1, the diesel engine 1 performs normal running in the region A. In this state, regeneration of the DPF 41 is determined by another routine, and the regeneration of the DPF 41 is started at the time t1 as shown in FIG. 2A.

Figure 2B:
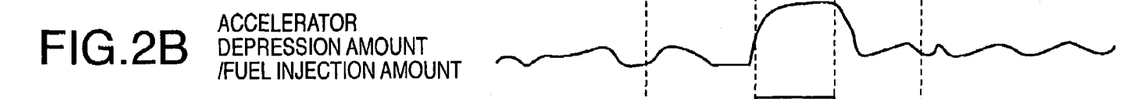
Figure 2C:
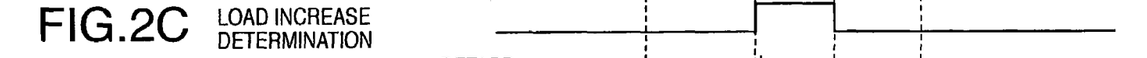
Figure 2D:
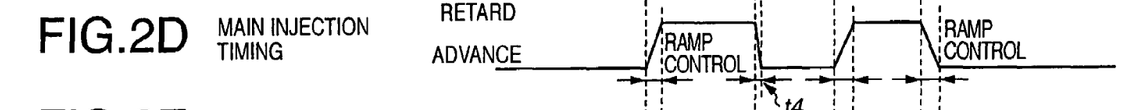
Figure 2E:
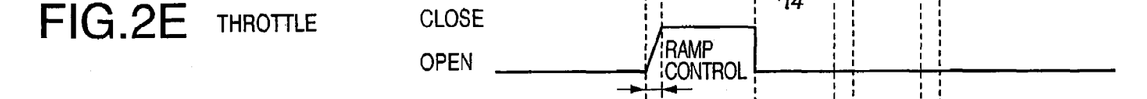
Figure 2F:
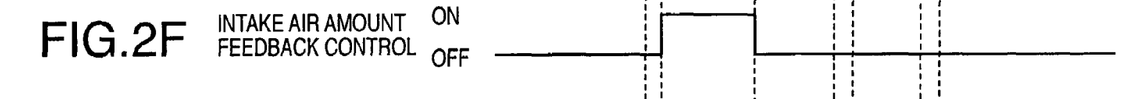

When the regeneration is started the engine controller 31 retards the main injection timing shown in FIG. 2D, decreases the opening of the intake throttle 42 shown in FIG. 2E, and starts feedback control of the intake air amount shown in FIG. 2F. Simultaneously, the main injection amount is increased in order to avoid a decrease in the engine output due to retarding of the main injection timing and decrease in the opening of the intake throttle 42.

The retarding of the main injection timing and decrease in the opening of the intake throttle 42 are performed under ramp control, and at a time t2, this ramp control is completed. At this time, the load and rotation speed of the diesel engine 1 are situated in the region A of FIG. 3, so the engine controller 31 starts feedback control of the intake air amount from the time t2 at which ramp control is completed.

During regeneration of the DPF 41, the engine controller 31, in the step S3 of FIG. 4, then determines whether or not the required load of the diesel engine 1 has increased beyond a predetermined level based on the variation amounts of the accelerator pedal depression amount and fuel injection amount. At a time t3, when an increase of the required load due to depression of the accelerator pedal to accelerate the vehicle is detected as shown in FIG. 2B, the engine controller 31, as shown in FIG. 2E, immediately fully opens the intake throttle 42, performs the processing of the steps S12–S14 of FIG. 5, and starts ramp control of the main injection timing and delay control with respect to the shift from intake air amount feedback control to intake air pressure feedback control.

Figures 2G, 2H:
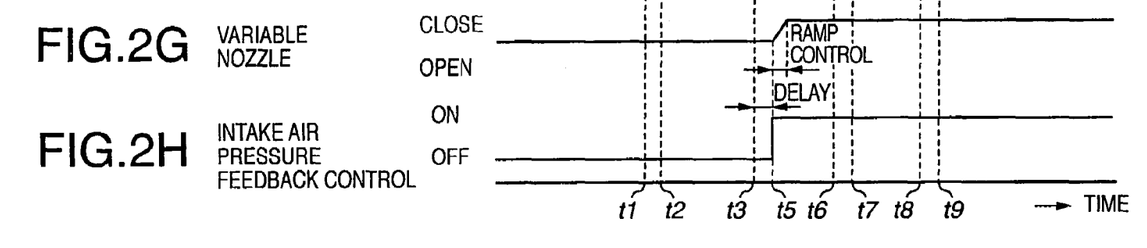

The ramp control shown in FIG. 2D is terminated at a time t4, and the delay processing shown in FIG. 2H is terminated at a time t5. It should be noted that an opening change of the variable nozzle 24 of the turbocharger 21 after delay control is also performed under ramp control. Herein, the variable nozzle 24 is operated in the closing direction so as to ensure the turbocharging pressure required for acceleration is available.

As a result of this control, the regeneration of the DPF 41 is interrupted, and the diesel engine 1 performs an acceleration operation for normal running.

When the timer reaches a time t6, the required load of the diesel engine 1 stops increasing, and the determination result of the step S3 of FIG. 4 changes from affirmative to negative as shown in FIG. 2C. The engine controller 31 restarts regeneration processing of the DPF 41 in the step S4 based on this variation. As a result of acceleration, the running conditions shift to the region B of FIG. 3, so when regeneration of the DPF 41 starts, the engine controller 31 increases the temperature of the exhaust gas by retarding the main injection timing and increasing the injection amount alone without decreasing the opening of the intake throttle 42, as shown in FIG. 2E. This is because, in the region B, the temperature of the exhaust gas can be sufficiently increased by performing fuel injection control alone without throttling the intake throttle 42. Fuel injection control is also performed under a ramp control which is identical to the ramp control from the time t1 to the time t2.

At a time t7, the retardation of the main injection timing and increase of the injection amount reach the state for regeneration of the DPF 41. Subsequently, the fuel injection timing is controlled based on a timing map for regeneration of the DPF 41.

At a time t8, regeneration of the DPF 41 completes. The engine controller 31 detects regeneration completion by the change in the determination of the step S1 of FIG. 4 from affirmative to negative, and in the step S2, shifts to normal running control. Specifically, the main injection timing map changes over to a normal running map, and increase of the injection amount stops. This operation is also performed under ramp control, and at a time t9, all processing is complete.

In this way, according to this invention, when the required load of the diesel engine 1 increases during regeneration of the DPF 41, the engine controller 31 interrupts control of the diesel engine 1 for regeneration of the DPF 41, performs normal acceleration control, and after increase of the required load has stopped, again performs regeneration control of the DPF 41. The diesel engine 1 can output sufficient torque for acceleration, and impairment of kinetic performance due to regeneration of the DPF 41 is prevented.

Also, in acceleration during regeneration of the DPF 41, when intake air amount feedback control is changed over to intake air pressure feedback control, a delay processing is applied when intake air pressure feedback control starts, so overboost due to excessive narrowing of the variable nozzle 24 is prevented.

In FIGS. 2A–2H, the case was described for the acceleration pattern #1 of FIG. 3 wherein regeneration of the DPF 41 is performed in region A and the vehicle accelerates into region B, but the vehicle acceleration pattern may be pattern #2 or pattern #3. For acceleration in pattern #2, i.e., acceleration within region A, the engine controller 31 applies the regeneration control pattern from the times t1–t4 of FIGS. 2A–2H to the regeneration control from the times t6–t9 after regeneration interruption. Likewise, for acceleration in pattern #3, i.e., acceleration within region B, the engine controller 31 applies the regeneration control pattern from the times t6–t9 to the regeneration control from the times t1–t4.

The contents of Tokugan 2004-076268, with a filing date of Mar. 17, 2004 in Japan, are hereby incorporated by reference.

Although the invention has been described above by reference to certain embodiments of the invention, the invention is not limited to the embodiments described above. Modifications and variations of the embodiments described above will occur to those skilled in the art, within the scope of the claims.

For example, in the aforesaid embodiments, the control of the diesel engine 1 during acceleration is taken to be identical to the control for normal running, and this is in order to increase the output of the diesel engine 1 from the regeneration state, but a different control from that for normal running may be applied to increase the output of the diesel engine 1 from the regeneration state, as long as the same result can be obtained.

In the above embodiment the parameters required for control are detected using sensors, but this invention can be applied to any regeneration device which can perform the claimed control using the claimed parameters regardless of how the parameters are acquired.

The embodiments of this invention in which an exclusive property or privilege is claimed are defined as follows:

What is claimed is:

1. A regeneration device for a diesel particulate filter which traps particulate matter contained in an exhaust gas of a diesel engine, the filter being regenerated by burning trapped particulate matter due to an increase in an exhaust gas temperature, the device comprising:
   an engine exhaust gas temperature regulating mechanism which increases the exhaust gas temperature to promote a regeneration of the filter; and a programmable controller programmed to:
determine whether or not there is an increase in a required load of the diesel engine during the regeneration of the filter; and
interrupt the mechanism to increase the exhaust gas temperature, when the required load of the diesel engine is determined to be increasing during the regeneration of the filter.

2. The regeneration device as defined in claim 1, wherein the diesel engine is an engine which drives a vehicle, and the increase of the required load includes a vehicle acceleration requirement.

3. The regeneration device as defined in claim 1, wherein the mechanism comprises an intake throttle which increases the exhaust gas temperature by decreasing an intake air amount of the diesel engine.

4. The regeneration device as defined in claim 3, wherein the controller is further programmed to interrupt the mechanism to increase the exhaust gas temperature, by controlling the intake throttle to stop decreasing the intake air amount of the diesel engine.

5. The regeneration device as defined in claim 4, wherein the mechanism further comprises a nozzle which increases the exhaust gas temperature by retarding a fuel injection timing into the diesel engine, and the controller is further programmed to interrupt the mechanism to increase the exhaust gas temperature, by controlling the intake throttle to stop decreasing the intake air amount of the diesel engine and by controlling the nozzle to stop retarding the fuel injection timing of injection fuel into the diesel engine.

6. The regeneration device as defined in claim 5, wherein the mechanism further comprises an intake air pressure feedback control mechanism which feedback controls an intake air pressure of the engine, and the controller is further programmed to interrupt the mechanism to increase the exhaust gas temperature, by controlling the intake throttle to stop decreasing the intake air amount of the diesel engine and by feedback controlling the intake air pressure via the intake air pressure feedback control mechanism.

7. The regeneration device as defined in claim 6, wherein the controller is further programmed to start feedback control of the intake air pressure via the intake air pressure feedback control mechanism when a predetermined delay time has elapsed after the intake throttle stopped decreasing the intake air amount of the diesel engine.

8. The regeneration device as defined in claim 6, wherein the intake air pressure feedback control mechanism comprises a sensor which detects an intake air pressure of the diesel engine, a turbocharger which turbocharges the intake air of the diesel engine and a variable nozzle which adjusts the turbocharging pressure.

9. The regeneration device as defined in claim 3, wherein the engine control device further comprises an air flow meter which detects an intake air amount of the diesel engine, and the controller is further programmed to feedback control the intake throttle to decrease the intake air amount of the diesel engine based on the intake air amount detected by the air flow meter.

10. The regeneration device as defined in claim 1, wherein the controller is further programmed to allow the mechanism to resume increasing of the exhaust gas temperature, when the increase in the required load of the diesel engine has disappeared after interrupting the mechanism to increase the exhaust gas temperature.

11. A regeneration device for a diesel particulate filter which traps particulate matter contained in an exhaust gas of a diesel engine, the filter being regenerated by burning trapped particulate matter due to an increase in an exhaust gas temperature, the device comprising:
an engine exhaust gas temperature regulating mechanism which increases the exhaust gas temperature to promote a regeneration of the filter;
means for determining whether or not there is an increase in a required load of the diesel engine during the regeneration of the filter; and
means for interrupting the mechanism to increase the exhaust gas temperature, when the required load of the diesel engine is determined to be increasing during the regeneration of the filter.

12. A regeneration method for a diesel particulate filter which traps particulate matter contained in an exhaust gas of a diesel engine, the filter being regenerated by burning trapped particulate matter due to an increase in an exhaust gas temperature promoted by an engine exhaust gas temperature regulating mechanism, the method comprising:
determining whether or not there is an increase in a required load of the diesel engine during the regeneration of the filter; and
interrupting the mechanism to increase the exhaust gas temperature, when the required load of the diesel engine is determined to be increasing during the regeneration of the filter.

* * * * *